(12) United States Patent
Jindra et al.

(10) Patent No.: US 11,455,353 B2
(45) Date of Patent: Sep. 27, 2022

(54) CONCIERGE SERVICE SYSTEM AND METHOD

(71) Applicants: Lawrence F. Jindra, Floral Park, NY (US); Joseph F. Dolezal, Old Westbury, NY (US)

(72) Inventors: Lawrence F. Jindra, Floral Park, NY (US); Joseph F. Dolezal, Old Westbury, NY (US)

( * ) Notice: Subject to any disclaimer, the term of this patent is extended or adjusted under 35 U.S.C. 154(b) by 608 days.

(21) Appl. No.: 16/375,758

(22) Filed: Apr. 4, 2019

(65) Prior Publication Data

US 2019/0392007 A1 Dec. 26, 2019

Related U.S. Application Data

(63) Continuation-in-part of application No. 15/214,244, filed on Jul. 19, 2016, now Pat. No. 10,346,552, and a continuation-in-part of application No. 13/986,480, filed on May 7, 2013, now abandoned.

(51) Int. Cl.

| | |
|---|---|
| *G06F 16/00* | (2019.01) |
| *G06F 16/9535* | (2019.01) |
| *G06F 16/951* | (2019.01) |
| *G06Q 10/02* | (2012.01) |
| *G06Q 30/02* | (2012.01) |
| *G06Q 50/10* | (2012.01) |
| *G06F 16/9538* | (2019.01) |

(52) U.S. Cl.
CPC ........ *G06F 16/9535* (2019.01); *G06F 16/951* (2019.01); *G06F 16/9538* (2019.01); *G06Q 10/02* (2013.01); *G06Q 30/0279* (2013.01); *G06Q 50/10* (2013.01)

(58) Field of Classification Search
None
See application file for complete search history.

(56) References Cited

U.S. PATENT DOCUMENTS

| | | | |
|---|---|---|---|
| 2006/0085280 A1* | 4/2006 | Murnan | G06F 16/951 705/26.1 |
| 2008/0120157 A1* | 5/2008 | Foster | G06Q 10/02 705/5 |
| 2009/0094072 A1* | 4/2009 | Rodenberg | G06Q 10/02 705/5 |

\* cited by examiner

*Primary Examiner* — Debbie M Le

(57) ABSTRACT

A system and method is provided for conversion of information provided on public and/or private networks and managing that information by categories and offering services relating to that information; and particularly to a system and method for offering services related to maintaining an easy to use consumer site which searches golf courses and provides accurate tee time and other information related to golfing services and collects revenue based on those services.

13 Claims, 12 Drawing Sheets

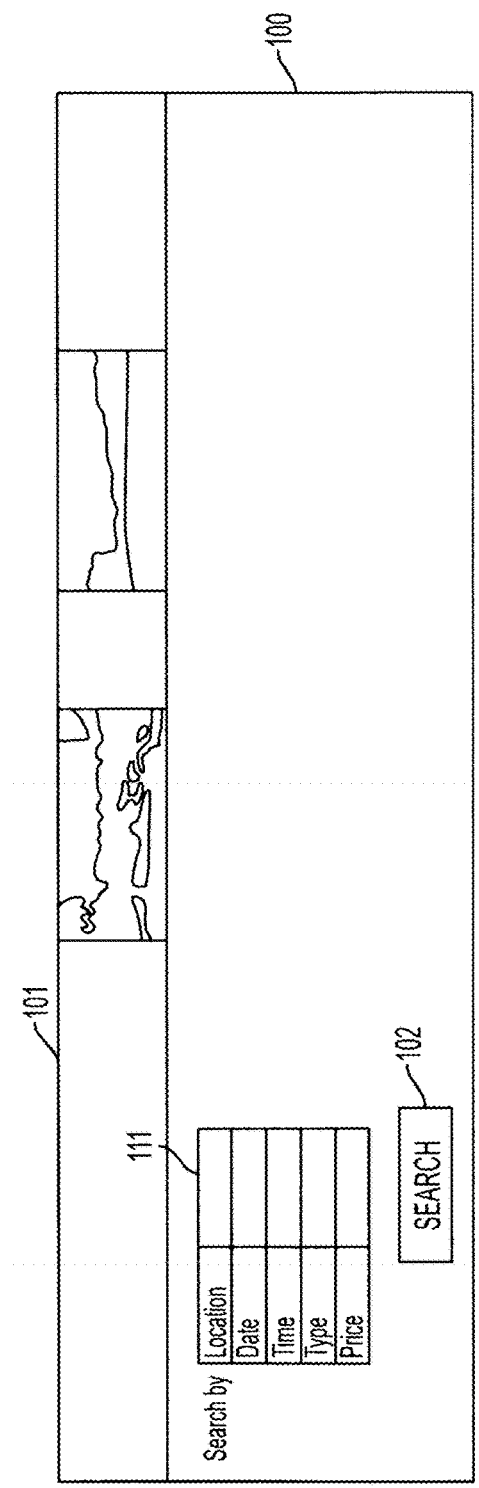

CONCIERGE SERVICE SYSTEM AND METHOD

PRIORITY

This application is a continuation-in-part and claims priority to co-pending U.S. patent application Ser. No. 15/214,244, filed Jul. 19, 2016, which is a continuation in part of application Ser. No. 13/986,480, filed May 7, 2013, and which claims the benefit of priority based upon provisional application 61/688,098 filed May 8, 2012 the entire contents of which are all relied upon and fully incorporated herein by reference.

BACKGROUND OF THE INVENTION

This invention relates to a system and method for conversion of information provided on public networks and managing that information by categories, and offering services relating to that information, and particularly to a system and method for offering an easy to use consumer site which searches golf courses and provides accurate tee time and other information related to golfing services.

There is an unmet consumer demand for an easy to use consumer site which can be adapted for different goods and/or services. For example, there is an unmet need for an easy to use consumer site that searches golf courses to make golf reservations using a number of preferences such as location and provides easy to use, accurate tee time information, while also providing access to charity golf events which may not be readily accessible to the general public.

SUMMARY OF THE INVENTION

The present invention provides a system and method wherein a user is enabled to log onto a web site having an interactive navigation system for searching and selecting tee time and associated golf course information. It can be appreciated that alternative embodiments of the invention can be adapted to include golf related apparel, equipment, and golf accessories. It can also be appreciated that alternative embodiments of the invention can also be adapted for concierge services for other services and goods in other market sectors, such as doctors, lawyers, restaurants, shoes, among other things.

In addition, in an embodiment of the invention, a transaction page can also be provided to enable a user to perform a secure transaction associated with the services on a selected website, such as purchasing a tee time reservation.

A system and method according to the invention can include searching the internet for public information related to golf courses and matching them to a user's requests and specifications. The user is provided with the ability to search by course, by date, by location, by price, among other things. The invention enables the user's selections to be quickly and efficiently matched with corresponding information provided by one or more courses. In addition, the system can permit the venue hosting the course to receive a secure on-line payment from the user.

A system and method according to the invention can also include collecting non-searchable local information related to golf courses in order to supplement the searchable information. Such non-searchable local information may comprise local documents, such as newspapers, magazines, newsletters, golf flyers, services coupons, fliers, handouts, and local mailings, as well as advertisements and/or offers for golf events, tournaments, golf equipment and clothing, and charity events; local oral information, such as information obtained by word of mouth, responses to interviews and questions which may be pertinent to a user, for example, the appropriate tip to give a caddy or whether night golf may be permitted; and local knowledge, such as information that is typically very specific to a region and period of time, for example, weather-related course closures. For example, the user may have specific search criteria, such as whether a certain color of attire is permitted at the golf course. This information is often not readily available over the Internet. The additional collection of local information supplements the available information to create a more comprehensive database of information for the user.

In another embodiment, a system and method according to the invention includes providing a service to enable a user with access to and means to participate in charitable outings at private courses, which may not be completely open to the public or to non-members of the associated golf course or golf club. In addition to searching the internet for available outings which are hosted at such courses, the system can include an additional layer to enable the system to access private information by including a step of submitting access information, such as a user name and/or password, of an individual or entity with authorization to access the private information. The user is provided with the ability to search both the public and private information by course, by date, by location, by price, among other things. The invention enables the user's selections to be quickly and efficiently matched with corresponding information provided by one or more courses. In addition, the system can permit the venue hosting the course to receive a secure on-line payment from the user which may include a payment to a charity.

This model benefits the consumer, the charity, as well as the golf courses, all in a lock-on step fashion, driven by ease-of-use and high consumer satisfactions for the user. In addition to providing access to otherwise unfound donations, the system provides for increased profits to golf courses along with increased capacity utilization, and reduced advertising costs for the golf courses. In addition to providing access to unfound donations to the charity, the invention provides for a broadening of both the scope and breadth of the charities outreach.

In addition, the invention can include a payment systems wherein one or more of the user, the golf course, and/or the charitable organizations (as a golf outing organizers) is charged either a usage fee associated with the registering for the services provided by a system according to the invention or to transaction fee based upon a completed transaction with the golf course or charity. In addition, the invention can include the capture of user information and preferences, as well as targeted advertising for one or more services chosen based upon one or more of the preferences chosen by a user. The system can include tracking of transactions consummated by a user for use with charging targeted advertising. For example, in one embodiment, the service can charge a brokerage fee to the user, a subscription fee from the courses, and/or generate advertising revenue based.

Specific examples are included in the following description for purposes of clarity, but various details can be changed within the scope of the present invention.

OBJECTS OF THE INVENTION

An object of the invention is to provide a system and method of searching public and privately available information associated with goods and/or services and to make offerings associated with those goods and or services available to users and to satisfy an unmet consumer demand for those good and/or services. More specifically, it is an object of the invention to provide a system and method of searching public and privately available information associated with tee times and charity golf outings and to make offerings associated with golfing opportunities available to golfers and golf planning agents.

Another object of the invention is to provide an improved and user-friendly, internet navigation and search for user activity, serve as a broker of such activities and services, and to supply a transaction service providing, in real time, such services to the consumer and ensuring the secure delivery of funds to the merchant, supplier, or business. It is a further object of the invention to provide a system which can be supported by providing advertisers with customized demographic user information along with quantified site visit data.

It is a further object of the invention to provide a sleek, interactive, and easy-to-use consumer web page and mobile device (i.e., phone or tablet) application for providing access to goods and/or services which may not be readily available to the public.

Another object of the invention is to provide a seamless and transparent behind-the-scenes internet navigation and web search, which includes a secure, interactive, and consumer-friendly transaction page, and which can scale up in breadth and depth for one or more services and/or goods. Another object of the invention is to provide such system which can be further scaled geographically, from local venues to other national venues and on to international venues. Another object of the invention is to provide such system which can be further scaled horizontally across products and/or services, from products and services that are related by type, to products and services related by geography, and/or from products and services that are related by type, to products and services related by relative pricing categories, among other things.

Other and further objects of the invention will become apparent with an understanding of the following detailed description of the invention or upon employment of the invention.

BRIEF DESCRIPTION OF THE DRAWINGS

A preferred embodiment of the invention has been chosen for detailed description to enable those having ordinary skill in the art to which the invention appertains to readily understand how to construct and use the invention and is shown in the accompanying drawing in which:

FIG. 1 is a diagram representing one or more search pages provided by an embodiment a concierge service system and method according to the invention.

FIGS. 2a, 2b and 2c represent one or more search results pages provided by an embodiment a system and method according to the invention.

FIG. 10 is a representative drawing of a user interface for a search result page for a modified embodiment of system and method according to the invention.

FIG. 11 is a representative drawing of a user interface for a search result transaction page for a modified embodiment of system and method according to the invention.

DETAILED DESCRIPTION

Figure 3:
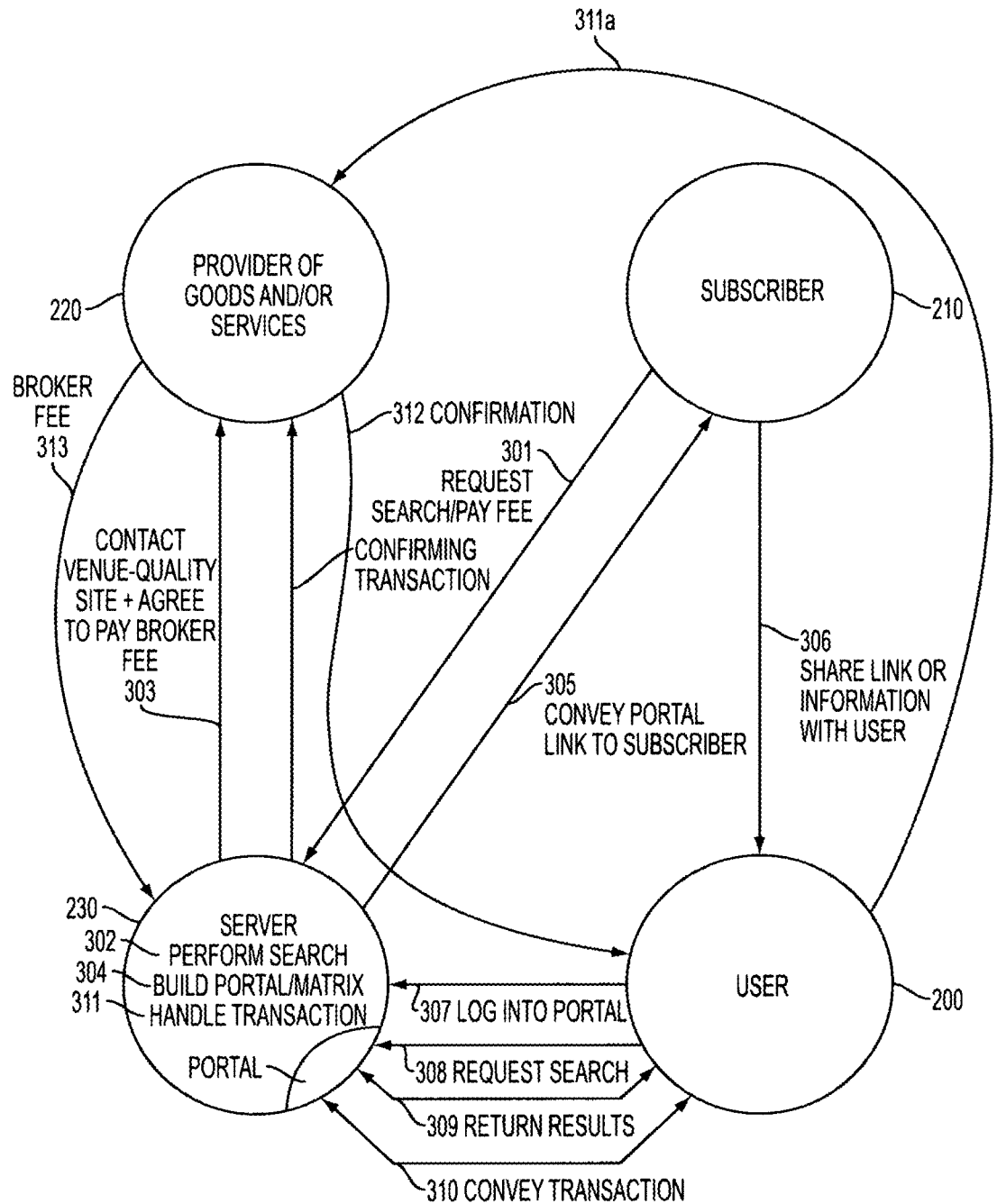
FIG. 3 is a schematic diagram of a modified embodiment of a process for a concierge service system according to the invention.

Referring to the drawing of FIG. 1, a concierge service system and method 100 according to the present invention is directed to a preferred embodiment which includes programming to provide an interface 101 that is provided for selection of one or more categories of search criteria 110 associated with a particular good or service. For example, the interface 101 can include a home page. In the preferred embodiment, the categories of search criteria 110 are associated with certain public and private golf courses and golf outings. The categories of search criteria 110 are selected through one or more processes described more fully within.

In one embodiment, the system and method 100 also includes programming to permit a user to enter one or more search criteria 111 appropriate for a category of search criteria 110. In addition, or in the alternative, the system can present one or more pre-determined search criteria 111 which are predetermined by the system as being appropriate for each category 110. For example, a customer can search by location, date, time, type of course, and price to play from the homepage. The processes by which the system determines the search criteria 111 that can be selected are described more fully within. For example, a user may select from auto-complete fill-in fields as the user enters information which will allow the system to present the user with the desired information faster, more efficiently, and in a format which will be both more helpful and more useful to the user. Once a user has entered and/or selected one or more search criteria 111, the user can request a search to be performed 102.

In a preferred embodiment, the system and method 100 also includes programming to search according to one or more search criteria provided by a user. In addition, or in the alternative, the system may include one or more additional predetermined criteria 112 to perform the search. Predetermined criteria 112 can include criteria based on saved user preferences associated with the user, or saved user preferences of a different user such as a concierge at a hotel who may have a predetermined list of venues with whom the hotel may have a preexisting business relationship, and/or additional predetermined system preferences which have been predetermined by the system to facilitate a search, such as national or local location information to narrow the search to terms a system administrator may deem pertinent to the users of the system. As an example of preexisting business relationships, a user may have knowledge of and or access to seasonal promotions, charity events, and or membership information which is not available to the public. As an example of predetermined system preferences, a system customized for the tri-state area near New York City in the United States may specifically limit its searches to the states of New York, New Jersey, and Connecticut, and/or to municipal and public courses.

Accordingly, in one embodiment customized for searching golf courses, a user will desire to search by location date time type of course, and price to play form the homepage. They may fill in as fields as they choose which will allow them to be presented with the desired information faster, more efficiently, and in a format which will be both more helpful and more useful to the user. This is one of the initial steps to start the search and/or internet search and web crawling process. It can be appreciated that a system according to the invention can be adapted for use with goods and/or services other than golf course reservations.

Figures 2B, 2C:
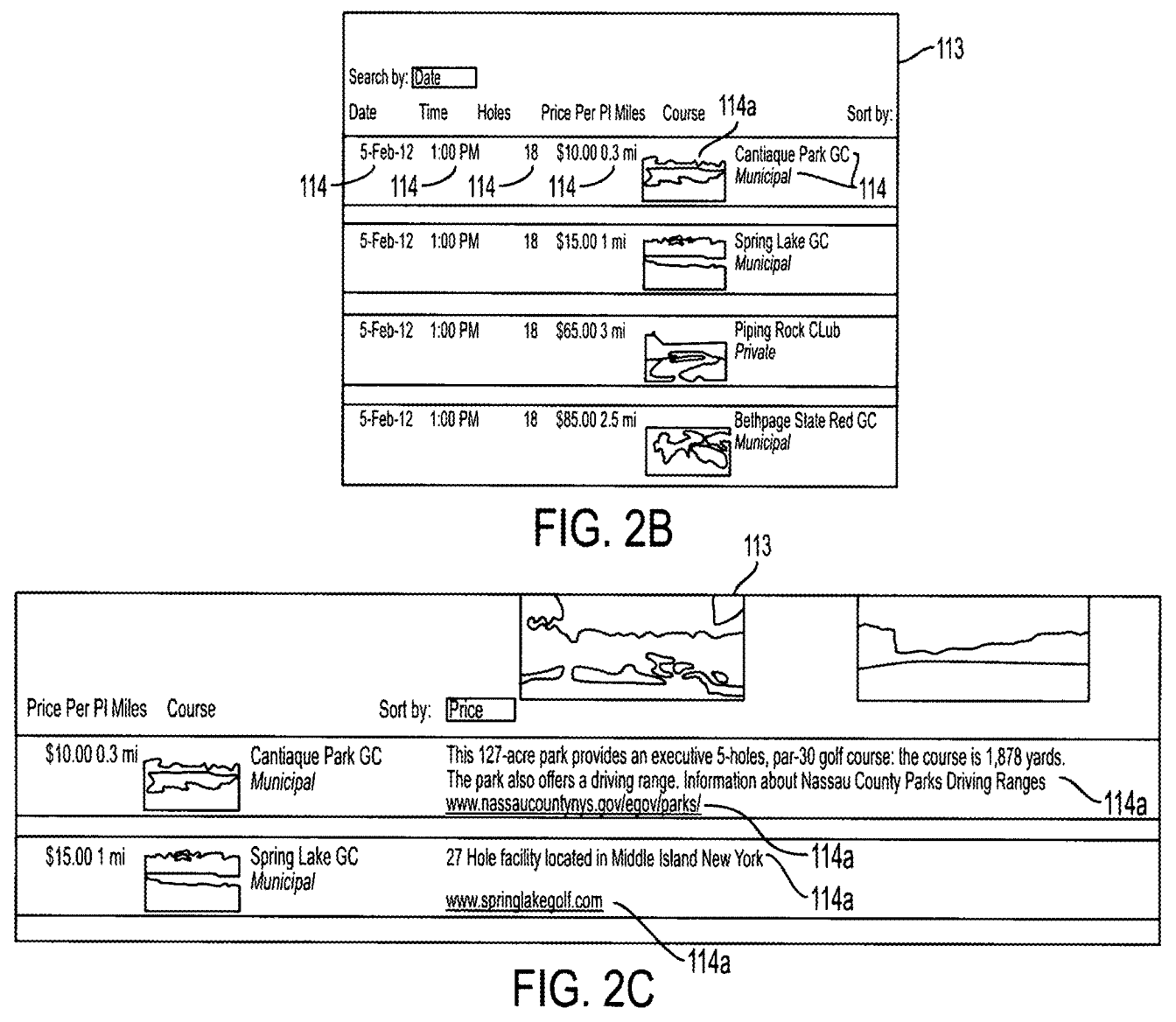

Referring to the drawing of FIG. 2a, once a search is performed a preferred embodiment of the system can display and/or send one or more search results 113. The search results can include one or more fields of search information 114 related to the search criteria 111 and/or predetermined search criteria 112. The search information can include other information associated with the search not specified in the search criteria. For example, in addition to search criteria such as "location," "date," "time," "type," and "Price," additional information 114a such as an image, a hyperlink, and/or textual description can also be included. In addition, the system can generate other information from other sources which may or may not be not specifically provided by the target of the search, such as driving directions to the golf course, course data, local information e.g., pro shop contact information, outing prices, such as for comparison purposes, and/or outing availability (on hard to access courses) which are open to the public via outings, golf course links, and/or catering links for golf outings, weddings, parties, and/or fund-raisers.

As shown in FIGS. 2b and 2c, if the initial search is for a particular date, such as for Feb. 2, 2012, a list will be presented showing available golf tee times of that day. In an embodiment of the invention customized for golf courses, the system includes programming to permit a user to fine tune their search. As another example, an embodiment of a system according to the invention can include programming to perform further searches and sorting, such as by price, in order to find the result (in this case golf course) that better matches the users need. The results list can be sorted again, by providing programming which enables the user to further select and/or fill-in fields to narrow the search down in accordance with the user's needs.

In an alternative embodiment of a system and method according to the invention, programming can also be provided to perform an initial search according to one or more sets of predetermined criteria. In one embodiment of the invention a plurality of criteria sets can be provided related to a category of goods or services. For example, in an embodiment of the invention adapted for golf services, one predetermined criteria set can include generally unavailable, unpublished and difficult to search golf outings in a specific geographic and/or municipal area such as Nassau county in New York. Therein, either web crawling and/or one or more internet searching algorithms can be used to search among civic, fraternal and/or service clubs.

An embodiment of a system and method according to the invention includes programming to store the search criteria, any predetermined criteria set, and any user input criteria. In addition, programming is provided to store search results associated with the criteria in a database. Programming can also be provided to build a unique profile associated with the user and search criteria associated with the user.

In addition, the system can include programming to save the search results in a separate database for access in future searches which can be used to optimize the search process, to more uniquely and more specifically meet each user's needs or the perceived needs of like users.

In a further embodiment of a system and method according to the invention, programming is provided to perform one or periodic update searches based on one or more search criteria, predetermined criteria sets and or saved user criteria.

An embodiment of a system according to the invention adapted for searching golf courses can include programming to perform at least the following: programming to permit a user to separate and search private or public courses; programming to permit a user to find available tee times and make reservations; programming to permit a user to determine the location of and directions to one or more golf courses; programming to permit a user to receive prices for a round of golf within the customer's budget; programming to permit a user to received either brief or verbose descriptive information about one or more selected golf courses; programming to permit a user to display helpful contact information phone numbers and website links; programming to permit a user to receive photos and/or images of selected golf courses along with course maps; yardage books and a score card; programming to permit a user to find outing costs with links to sponsoring charity websites; programming to permit a user to find course architects and designers, among other things.

Accordingly, a system according to the invention can permit a user to visit, browse, and use the system to find information currently already available on the internet and/or stored on the system. Although the search results may only contain partial content of available information, by presenting the information in a partial content the system presents the information in on one user friendly and easy to use website. An embodiment of a system according to the invention can permit a user to use the system as a tool to navigate through golf course information, to save valuable personal and computer time, to connect them to data they desire or require, and to provide them with the answers they seek and would otherwise need hours to discover, to price together and/or to receive.

Alternative embodiments of a system according to the invention adapted for searching golf courses can also include programming to provide one or more semi-autonomous configurations or combinations to permit the system and method to perform more or less stand alone. For example, in one embodiment the of the invention the system includes programming to a complete search maneuver each time it is requested by a user and search criteria entered by a user can be sent by the system to an internet site returned from a search result to provide information associated with the sent criteria. Thereafter the system can directly link a user to the internet site associated with the golf course selected from the search result. In addition, or in an alternative embodiment, the system includes programming to wait for a defined period to ensure confirmation from the target internet site before sending a link to the user. For example, after executing a sub-search on target internet site, the system can include programming to wait for results of the sub-search performed by the target internet site. Similarly, a further embodiment of the system can include programming to permit a user to securely submit payment information to make a reservation at the golf course. Accordingly, a further embodiment of a system according to the invention includes programming to wait for a period of time, such as either a predetermined period of time, or upon receiving confirmation from the target internet site to which the payment has been submitted before the informing the user and/or billing the user for use of the system.

Alternative embodiments of a system according to the invention adapted for searching golf courses also include programming to save data that has been retrieved from one or more searches by a user which data is saved in a database with information associated with a user, and programming to make all or part of such data available to the user by the system. Accordingly, the system permits a user to access saved information for requesting the tee times, providing directions, dress code information and other pertinent information available to protect against miscommunication of the selected reservation and tee times.

FIG. 3 shows an alternative embodiment of a method and system according to the invention having one or more steps or processes that can be included in or as one or more the above-described systems and methods. It can be appreciated that one or more the steps can be performed in an order other than the order or sequence as described herein. In FIG. 3, lines of communication are shown linking a user 200, subscriber 210, provider of goods and/or services 220 and a concierge server 230 for a concierge service system according to the invention.

In a first step 301, a user 200 or subscriber 210 requests a search. In the case of a user, the user may request the search directly from either the server 230 or a subscriber 210.

In one embodiment of the invention, programming is provided so that in the event a subscriber 210 requests a search from the server 230, the server 230 determines whether or not the subscriber 210 has subscribed to receive services from the server 230. In addition, programming can be provided for the server to securely accept payment from the subscriber for use of one or more of the services provided by the server 230. For example, a vacation resort can subscribe to a service which locates golf outings, destinations and golf packages in an area relevant to the vacation resort and provides that information to the vacation resort for a per use, periodic or other subscription fee.

In a further or second step 302, the server 230 performs a search according to one or more criteria associated with the subscriber 210 or user 200. The server 230 includes programming to save the results of the search which include one or more providers of goods and/or services 220.

In one alternative embodiment of the invention, the server 230 includes programming and/or performs a third or additional step 303 of contacting a provider of the goods or services to determine whether the provider 220 is qualified and/or meets the criteria desired by the server 230 and/or determines whether or not the provider 230 agrees to pay a fee for the server 230 to direct potential customers of the provider 220 to the provider 220.

In another or fourth step 304, the server 230 saves the information associated with the provider in a database and/or matrix. In addition, or in the alternative, the server 230 builds a portal through which a user can access the provider's goods and/or services by communication first directly through the server. In a further or fifth step 305, the server 230 communicates a portal link or information associated with the provider's goods and/or services to the subscriber 210 and/or user 200. In an embodiment of the subscriber receiving the information, the subscriber can additionally communicate the link and or provider information to a user 200 in a further or sixth step 306.

In a further or seventh step 307 according to the invention, a user 200 is enabled to log into the server 230 such as by using a link and upon logging in the user can access a search request and/or search result information. In a further step, the server 230 can perform a new search or retrieve saved search information to the user 309. Upon receiving the search information from the server 230, in a further step 310 a user 200 can convey transaction information associated with the search. For example, a user can provide to the server 230 information to make a golf tee time reservation and/or purchase golf shoes.

Upon receiving the user's transaction information, the server can handle the transaction between the provider 220 and the user 200. In an alternative step 311a according to an embodiment of the invention, the transaction is handled between the user and the provider. Upon consummation of the transaction by the provider 220, confirmation information can be sent to the user 302. It can be appreciated by a person of ordinary skill in the art that additional steps and processes can be included for providing secure financial transactions among a server, user and a third-party goods and/or service provider.

In an additional optional step 313, the server 230 can request and/or receive a fee from the provider 220 which fee is associated with the transaction consummated between the user 200 and the provider 200.

Figure 4:
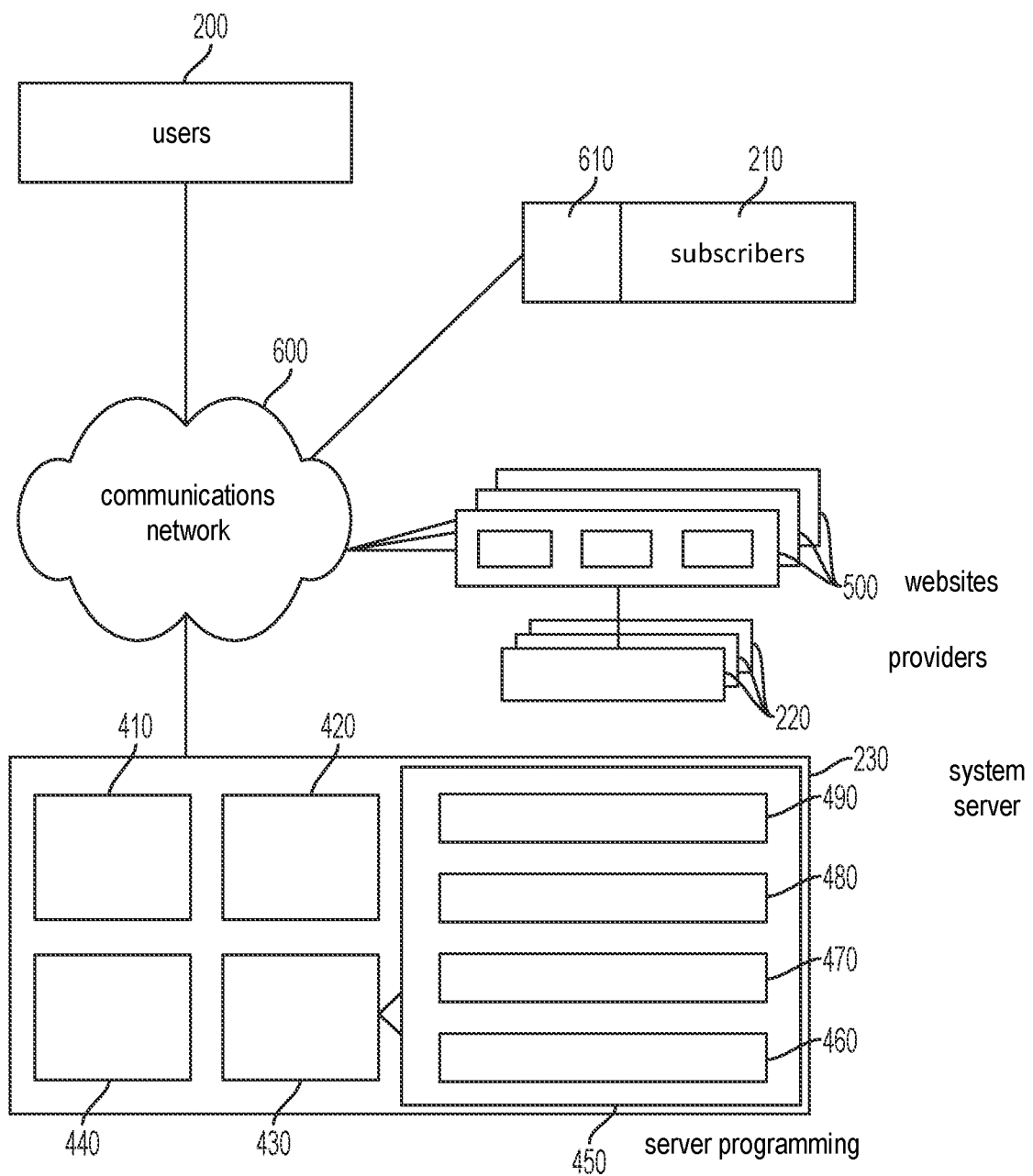
FIG. 4 is a schematic diagram of a concierge service system according to the invention.

FIG. 4 illustrates a schematic view of a concierge service system according to the invention in which a server 230 is in communication with a communications network 600, such as the Internet, to which are also communicatively connected one or more users 200, one or more subscribers 210, and one or more providers 220 each having an associated website 500 which may be a target of one or more searches of the system.

The system comprises a server 230 having a processor 410, a communications port 420 such as an internet modem, memory 430 and at least one user command interface 440, such as a touch screen, mouse and/or keyboard. In addition, the server 230 includes server programming 450 for performing one or more of the steps and for functions described above with respect to FIGS. 1-3, which can include including programming for network communications, database management, a user interface, server home page, server search page, subscriber portal internet page, provider portal internet page, among other things.

Specifically, the programming includes one or more databases or matrices 460 for storage of criteria, search results, and/or user and subscriber information. In addition, or in the alternative, one or more databases 460 can be provided for storage of subscription fee information for managing payments by a subscriber 210 for use of the server. In addition, or in the alternative, one or more databases 460 can be provided for storage of referral and/or broker fee information for managing payments by a user 200 and/or provider 220 for consummated transactions.

In addition, the server programming 450 includes programming for one or more search engine programming 470 which search engine programming 470 can be either a stand-alone search engine or alternatively be programming to effect a search through a third party search engine which is not part of the system. The search engine programming includes programming to affect the above described functions related to the searches described above with respect to FIGS. 1-3, including use of user criteria, predetermined criteria, and subscriber criteria among other things.

Furthermore, the server programming 450 includes programming for one or more portals 480 which portals 480 can be include a link to a third party website, such as a provider website 500 associated with a provider 220 and/or programming to emulate portions of a provider website 500 related to the transaction details pertinent to the search. For example, instead of providing all the information that may be available on a provider website 500, select information such as search information 114 associated with a provider 220 can be programmed for display as shown in FIGS. 1-2.

In an alternative embodiment of the invention, the server programming 450 can include programming for a portal builder 490 for providing at least a semi-automated retrieval of criteria information and search results from third party websites, such as a provider website 500 associated with a provider 220. The portal builder 490 includes one or more keywords associated with at least one criteria, which keywords are used for searching within the hypertext markup language of a search target website 500 associated with a provider 220. When there is a match of a keyword for a criteria with a form field on the target website 500 associated with the keyword, the portal builder 490 can store a link associated with that form field. For example, in an embodiment customized for golf services, as shown in FIGS. 1-2, a tee time can be entered by a user into a tee-time search field on a search page of a portal maintained by the system. When the tee time is entered, the system can query the target website 500 of a provider 220 by inserting the tee time information into the form field stored by the portal builder 490.

In an alternative embodiment of a system according to the invention, the system can include client programming 610 which can be provided to a subscriber 220 of the services provided by the system. The client programming 610 can include programming to perform one or more of the above-described functions of the programming of the server 230. Among other things, the client programming 610 can include a programming for a subscriber portal customized for the goods and/or services desired by a subscriber 210. For example, a subscriber 210 may be a resort which desired a simplified portal for its guests or users 200 to access one or more goods and/or services associated with the resort, including golf, tennis, restaurants and shopping. Accordingly, the client programming 610 can include programming for separate portals tailored for searching criteria relevant for golf, tennis, restaurants and shopping.

Many golf websites are not readily searchable because they are not optimized for the Internet and have additional information on their sites, for instance, information saved in non-searchable documents. In addition, golf is a sport for which useful information is often distributed locally through people with knowledge of golfing in particular areas, and passed by word of mouth. This makes it difficult to retrieve relevant golfing information on an ongoing basis.

In the present invention, a concierge system and method 100 to collect, organize and present this information to users 200 or subscribers 210, a useful aspect is that it minimizes the amount of time and difficulty it takes a user 200 or subscriber 210 to compile the relevant information on his/her own.

In a further embodiment of the invention, the concierge system is intended to provide an alternative to a human concierge system having local knowledge and provides a method for finding difficult to find, local information, saving it on a server 230 and allowing users 200 or subscribers 210 to access this information in order to reserve or purchase goods or services from providers 220.

Accordingly, a further aspect of the invention includes several steps to supplement generally accessible/searchable databases.

Figure 5:
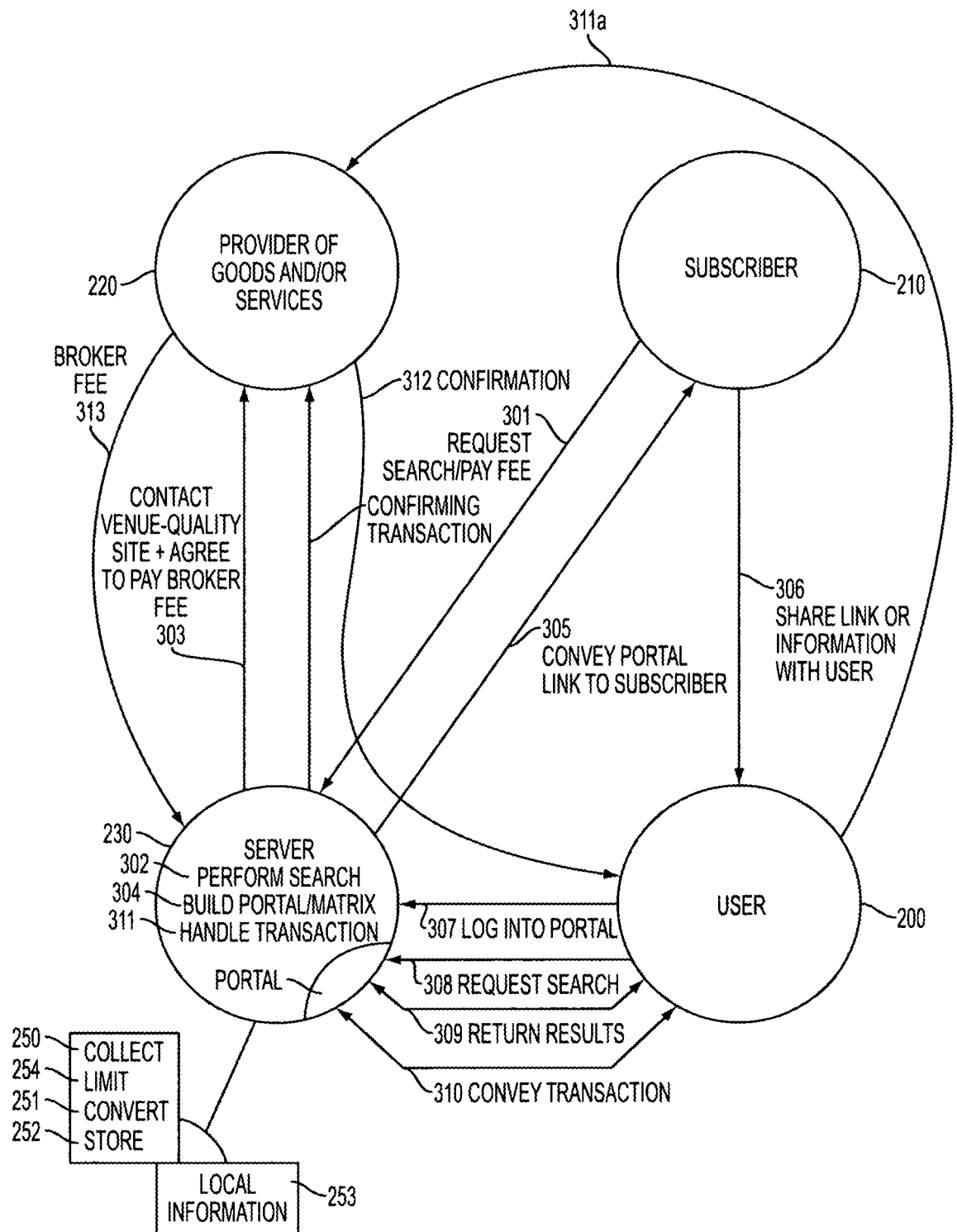
FIG. 5 is a schematic diagram of a modified embodiment of a process for a concierge service system according to the invention.

FIG. 5 displays an alternative process in an embodiment of the invention. The process includes the steps of collecting 250 local information, limiting 254 the information to useful information, converting 251 the local information 253 into searchable information and storing 252 the searchable information into a searchable database for retrieval at a later time. The concierge system contains programming to collect, limit convert and store the local information.

In a preferred embodiment, the system collects such local information periodically such that the information that is collected is timely. The step of collecting 250 local information 253 includes collecting local documents, local oral information and local knowledge. Local documents include non-converted documents such as newspapers, magazines, newsletters, golf flyers, services coupons, fliers, handouts, and local mailings, as well as advertisements and/or offers for golf events, tournaments, golf equipment and clothing, and charity events.

Local oral information includes much of the same information contained in local documents but obtained by word of mouth. In addition, local oral information includes responses to interviews and questions which may be pertinent to a subscriber. For example, the appropriate tip to give a caddy, or whether night golf may be permitted.

Local knowledge includes much of what may be obtained through local oral information, but also includes information that is typically very specific to a region and period of time. Local knowledge includes weather related information, such as course closures due to flooding, or closed, non-public events.

The step of limiting 254 the information includes paring down the information to information the system determines will be useful to a future user. The system programming stores information as local non-searchable data fields which the programming fills in with the local information it collects and which potential users may need. For example, such fields include information about golfing dates, times, prices and proper attire at different courses. In this way, the system limits the world of information that is useful for its users. There may also be an option in the system for a user to input an additional need and type in what the user is looking for.

Since the information is limited, it is possible that when a user accesses the site the information the user needs will not be available. If so, the system includes programming to update a database and create a new field for the requested information. The service will respond to the user's request by collecting new information from local knowledge, converting the information and then storing it on its server. In this way, the system collects, limits, converts and stores information on a periodic basis based on actual user needs. The concierge system knows to look for this information in the future and add it to the local knowledge database.

The step of converting 251 said local information into searchable information includes: scanning local documents onto the server 230. For example, the documents can be scanned into a digital medium such as a pdf format document. Thereafter, technology such as optical character recognition can be used to convert 251 the documents into a searchable form.

The step of storing 252 the searchable information includes storing the information on a server 230. The step of storing can include ascribing categories for fields for the information contained in the documents for inclusion into a searchable database.

In addition, the step of storing includes a user providing specific information, such as local oral information and local knowledge directly into the database.

Thus, all of the information in this first step is organized and saved onto a database for retrieval at a later time.

In a further embodiment of a method according to the invention, a user 200 or subscriber 210 will visit the site and the user or provider will create a profile. The profile contains user profile information such as the location where the user is interested in playing golf, the times the user would like to play, and how much money the user would like to spend, thereby limiting the results the system will retrieve for that user at a later time. Location information is applied as well, to a local expandable scrollable map for easy decision-making on available events in the user's region or one they will be visiting.

Thereafter, the database search is performed comprising data that is already saved on the server 230. The results will be displayed to the user 200 or subscriber 210. The solution features delivery of results via web-based applications as well as iOS and Android apps. Results can include push delivery of relevant options to the user's 200 phone or other smart device, as well as browser.

A system according to the invention can also include intelligent calendar suggestions. In one embodiment, a user can upload their calendar and/or share their calendar with the concierge system. Accordingly, a further embodiment of a method according to the invention compares the user's calendar with days/times for events in the search more intelligently. For example, prefilling dates of the search with the dates/times the subscriber is travelling in the particular region.

Alternatively, eliminating suggestions (e.g. for times they already have appointments during). In addition, consideration of transit times from their location to the golfing location is incorporated into this calculation and can be adjusted by the user. In addition, calendar information can be used to supplement the search for local information where local information can include weather conditions covering the duration of the subscriber's calendared visit.

In addition, or in the alternative, an additional related internet search can be performed using the collected local information on a search engine such as Google to provide more results. Any additional results will be displayed to the user 200 or subscriber 210 to supplement the search database.

Since the user 200 only receives relevant search results, it limits the amount of time the user 200 needs to spend searching golf information online. The system and method provides the user 200 with access to information that is not readily available through Internet searches. Without this invention, the user 200 or subscriber 210 would need to search through non-searchable documents such as golf sites, pdfs, newspapers and other information to find all available options.

Figure 6:
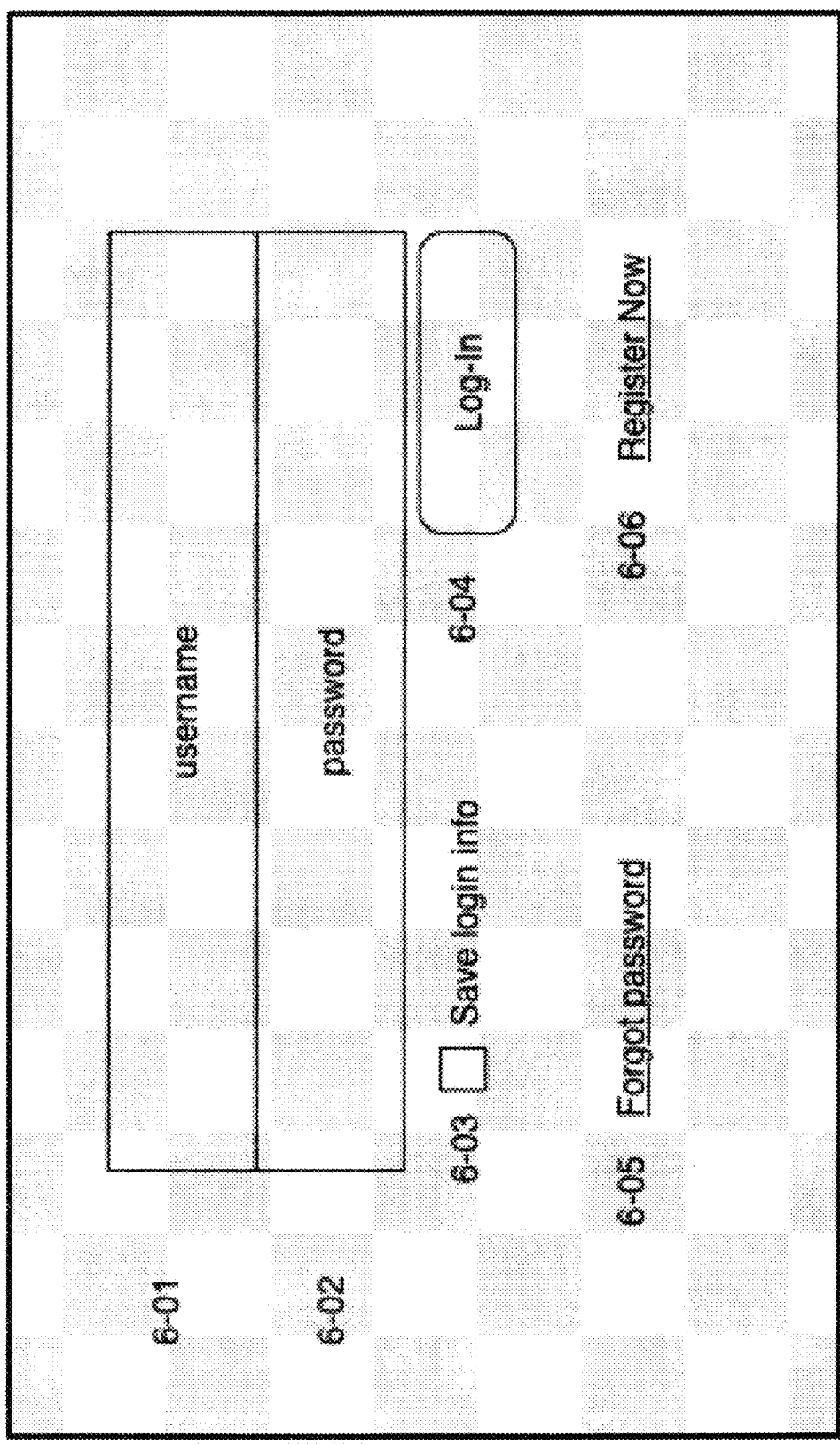
FIG. 6 is a representative drawing of a user interface for a login screen for a modified embodiment of system and method according to the invention.

FIG. 6 is a representative drawing of a user interface for an additional embodiment of a system and method according to the invention.

As described before with respect to FIG. 4, the system server 230 can include server programming 450 for performing one or more of the steps and for functions described above with respect to the following FIGS. 6 through 12, which can include including programming for network communications, database management, a user interface, server home page, server search page, subscriber portal internet page, provider portal internet page, client system programming, among other things.

Accordingly, in an alternative embodiment to log into the system, such as provided by step 307 shown in FIG. 3, a login screen 603 can be provided, wherein a username dialog box 601, and password dialog box 602 is presented to a user to enter their username and password, whereupon the system can store the information in a username field and password field in a user information or credentials file 465 of the database 460.

It can be appreciated that in a further embodiment, the system provides includes programming to store 603 the member's credentials within a file on a local or client device 210 (i.e. cookie). In addition, programming to retrieve their password can be provided as a forgot password request 605. In addition, programming to register as a new user can be provided as a register now request 606.

Information communicated between a client 210 and server can be secured during transmission using industry standard SSL 256 bit encryption to protect the data from being compromised, collected or used against the member or the system in any way or manner not authorized by the member or the Company.

Figure 7:
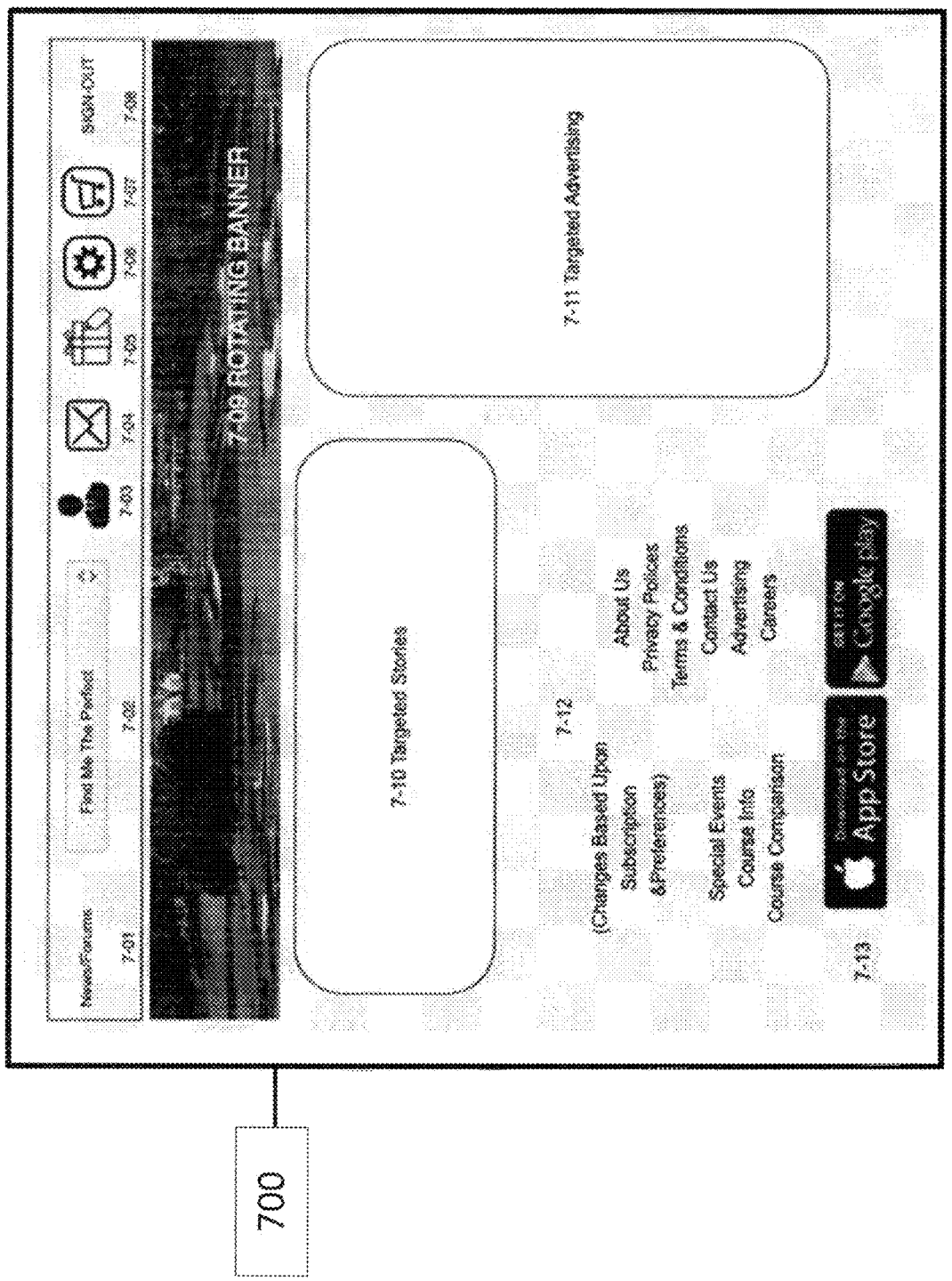
FIG. 7 is a representative drawing of a user interface for a home page for a modified embodiment of system and method according to the invention.

FIG. 7 is a representative drawing of a user interface for a modified embodiment of system and method according to the invention.

In an alternative embodiment of a user interface 101 the system, a home page 700 can be provided to a user once the user logs in as a subscriber, or to a user or guest prior to logging in or registration, such as may be provided by step 310 shown in FIG. 3 wherein the portal conveys information to a user.

A user, who may be a guest as no information regarding the individual nor preferences have yet to be obtained by means of user entering login information or registration information, is permitted to search and receive back summary results from the system, but the system cannot complete a transaction on behalf of an unregistered user until the user completes registration.

A home page 700 user interface, as shown in FIG. 7, can include programming for a "News & Forum access" 701, a search "Find the Perfect" dropdown box 702, Concierge service 703, Internal messaging 704, Incentive program 705, Subscriber defaults 706, Shopping cart 707, Sign-out button 708, rotating banner ads & promotions 709, targeted news stories 710, targeted advertising 711, internal links 712, download custom mobile app 713, among of the things. Banner and promotion 709 can offer incentives that are viewable via the link, FIG. 705, which can provide gifts or discounts.

More specifically, in a first embodiment, the home page has a search dropdown button 702, wherein programming is provided to display a search window 800 on the user interface.

In addition, or in the alternative, a further embodiment a search drop-down button 702 provides an alternative method for interactive use of the concierge service, whereby the user has indicated in the user preferences utilization of a concierge services script process 495. The concierge service script process includes a re-iterative series of steps wherein the system prompts the user for information either audially and/or by displaying a text box pop up with the question and/or information presented. Thereafter, the system receives information either typographically or by voice command, thereby facilitating the entry of search criteria associated with the user.

An embodiment of the system and method according to the invention includes a concierge services script process and concierge script programming 495 for prompting a user to enter information and receiving the prompted user information. More specifically, the concierge services script process and programming 495 facilitates communication between a user or subscriber and the system whenever a user or subscriber enters information, such as during registration of a user, as well as setting initial user preferences as described further below, and shown in FIG. 15. They can be appreciated that advances in artificial intelligence can be incorporated within the scope of the invention to provide additional processes and information specific to a user and/or provider for facilitation of the concierge service script process and programming 495.

Figure 10:
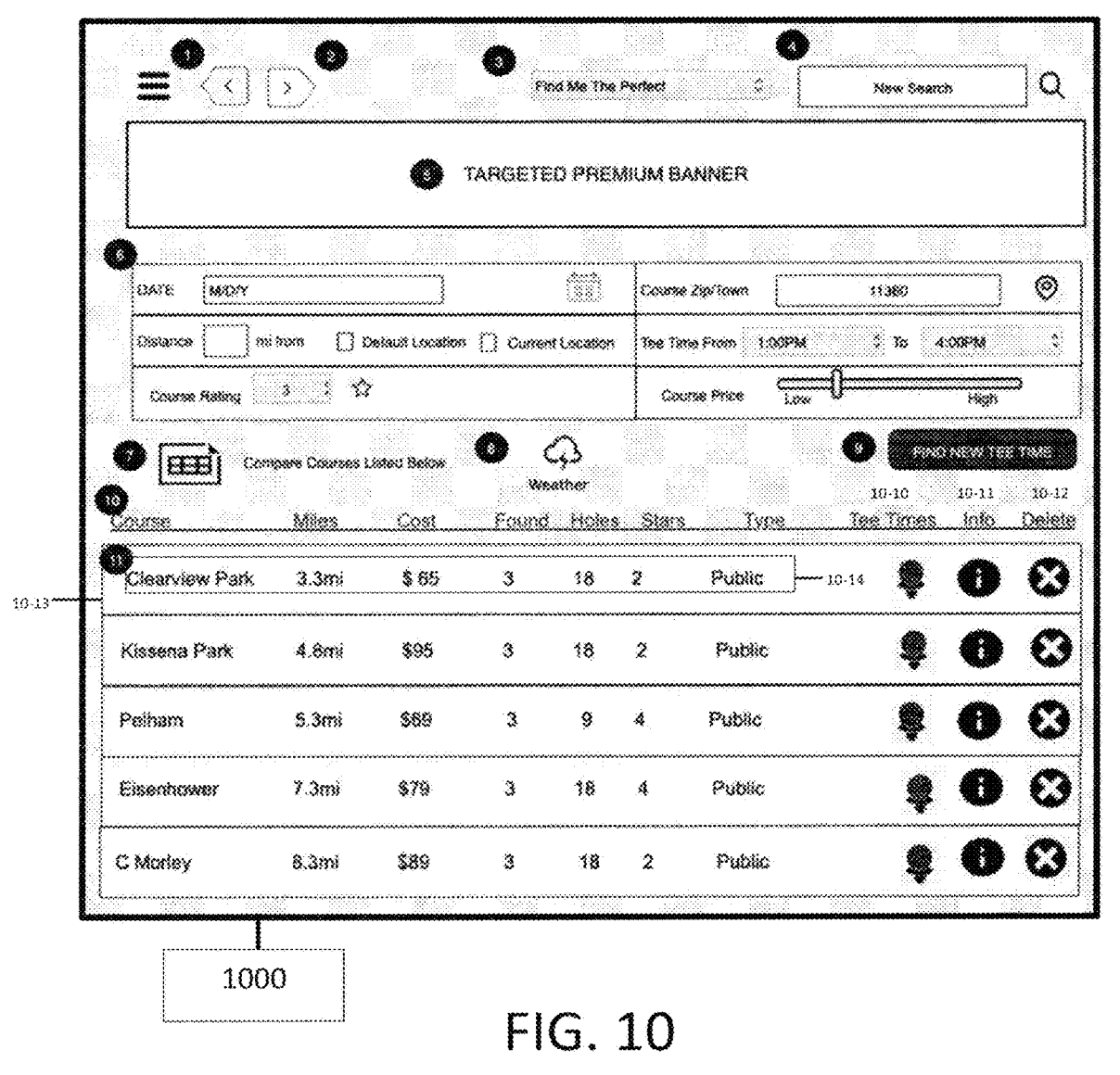

For example, in one embodiment the concierge services script process in response to a user selecting from a drop-down selection "to find a tee time" will thereafter prompt the user to enter information associated with the search window such as shown in FIG. 10, including date of services 801; geographic designation, such as the zip code or city and state 802; maximum distance from the location entered 803, or utilization of default settings 804, 805; as well as detail regarding the services requested, such as starting tee times, 806; cost, 807, course rating 808; course public, municipal or private course, 809, among other things.

As described above, user information can include an individual's name, email address, skill set, default location and radius in miles for searching, among other things. The subscriber is further able to add additional preferences, and thus information associated with the user can be expanding by providing new fields associated with additional services as the user utilizes the system and method according to the invention.

The system provides access to a registered user to be update the user preferences and information associated with the user.

The system and method according to the invention also provides an interactive process for the concierge service whereby the user can either enter typographical information manually, when defining criteria or, the system can present an animated avatar which is available based upon user preferences, whereupon a user activating the avatar, initiates a voice recognition process which employs a script prompting a user for the information and receiving feedback information from the user by voice commands.

Figure 8:
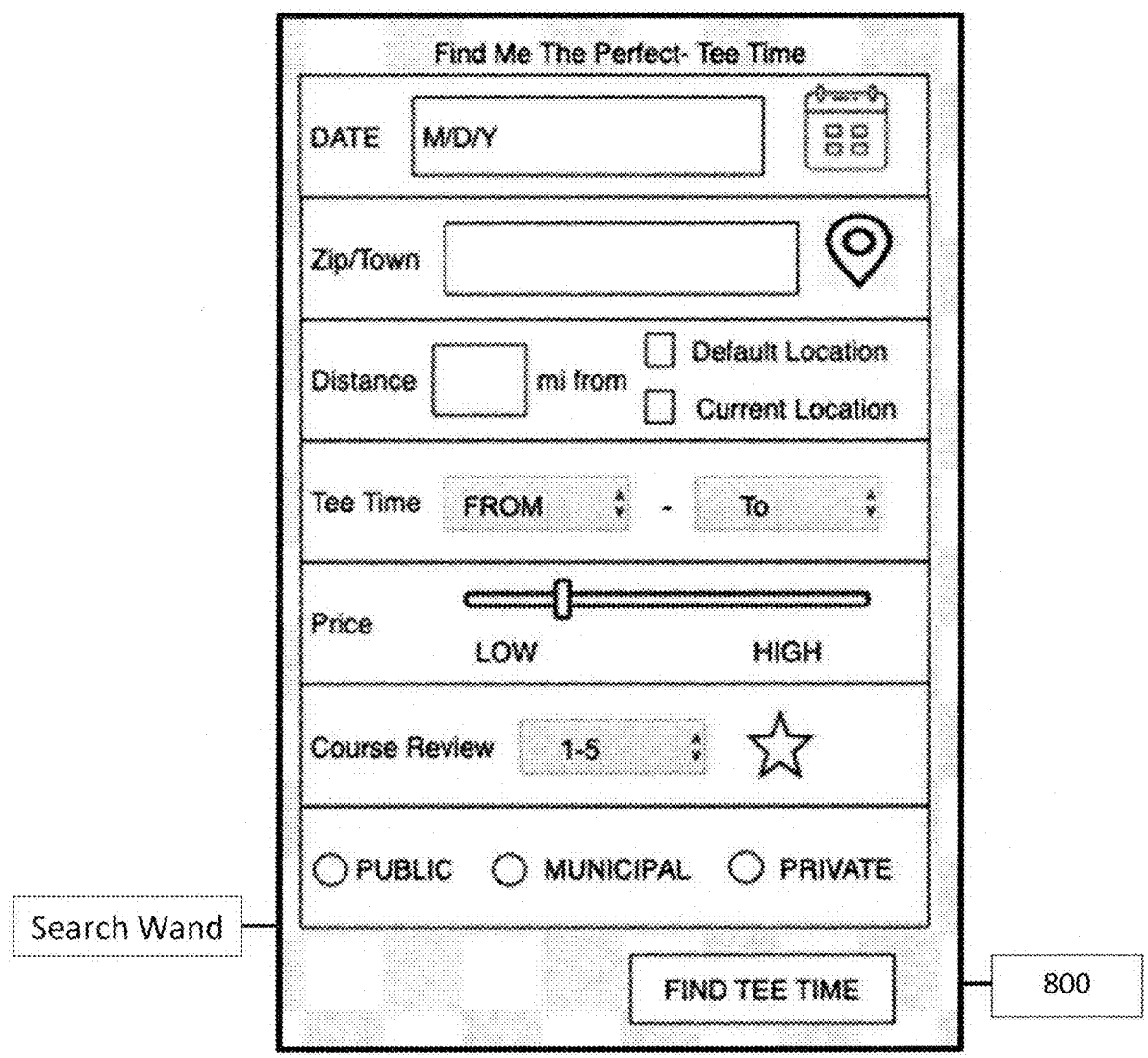
FIG. 8 is a representative drawing of a user interface for a search page for a modified embodiment of system and method according to the invention.

FIG. 8 is a representative drawing of a user interface for a modified embodiment of system and method according to the invention. Specifically, FIG. 8 shows a search window 800 such as may be provided by the system in FIG. 2a, and step 301 of FIG. 3. The system is provided with programming wherein a search window 800 is provided for a user interface wherein a number of interactive features can be provided with functionality to facilitate a search. Among other things, programming is provided to accept user instructions and user's parameters for a search (801, 802, 803, 804, 805, 806, 807) and programming to execute a search 808.

More specifically, user parameters include parameters associated with the service type, such as search date 801, location information such as Zip code or town and state, 802, proximity information, such as distance in miles 803, which can include one or more alternative default parameters such as a default location 803A, and/or current location 803B. In addition, parameters can include reservation Tee Time start 804, range of price such as green fees 805, visitor reviews and or Course Rating 806, and other relevant data which may be included in one or more fields of the services being offered, such as Course Type 807.

In another embodiment of the search function, according to the present invention, the system includes programming to provide an interface such as the drawing of FIG. 8, to locate available tee times at golf courses on a date 801, and within the defined graphical location 802, 803 together with the starting point of the default location 804 or the current location, 8-05; and during the time period 806. Additionally, the embodiment can narrow the scope of the results when the subscriber enters a cost amount 808, and if the course should be public, municipal, private, 809, or a combination thereof.

Should the user execute the search 808 from a client machine, the system transmits information associated with the search parameters 111 and a search command as a compound search request to the server system 100 for processing, such as can be provided by step 302 in FIG. 3.

Once a user has registered, the screen will display the results as depicted in FIG. 10.

The step of performing the search 302 can also include preprocessing of request to reconcile the search request and search parameters 111 with information associated with a registered user, such as registered user profile data 462, as well as pre-existing information in a user credentials database 465, as well as search criteria 110, predetermined search criteria 111 and additional predetermined criteria 112 which may preexist in the database 460.

If the user is a guest and not yet registered, the server system performs a search 302 by performing a search on a primary search database 461. The primary search database 461 provides a lightweight solution for problems associated with processing intensive database maintenance which can be an issue for large databases having multiple queries and frequent and/or live modification of fields and data therein. Accordingly, a guest who is not yet registered is provided with a solution that can be performed relatively quickly without imposing greater processing that may be required by search request from registered users.

Figure 12:
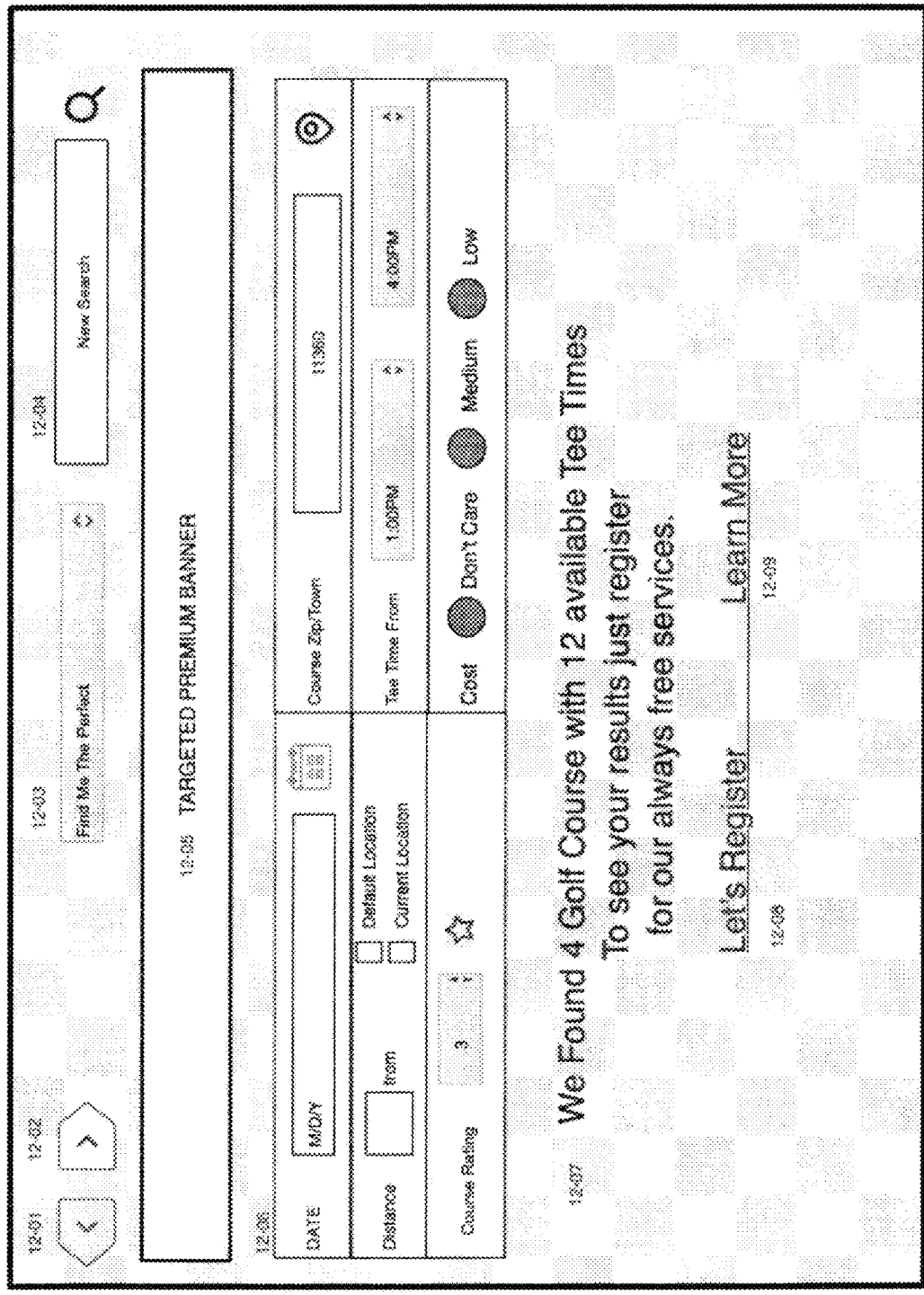
FIG. 12 is a representative drawing of a user interface for a guest search result page for a modified embodiment of system and method according to the invention.

If the system executes the search by the unregistered guest, the system is provided with programming to display a guest search results window 1200 as shown in FIG. 12, described more fully below.

Figure 9:
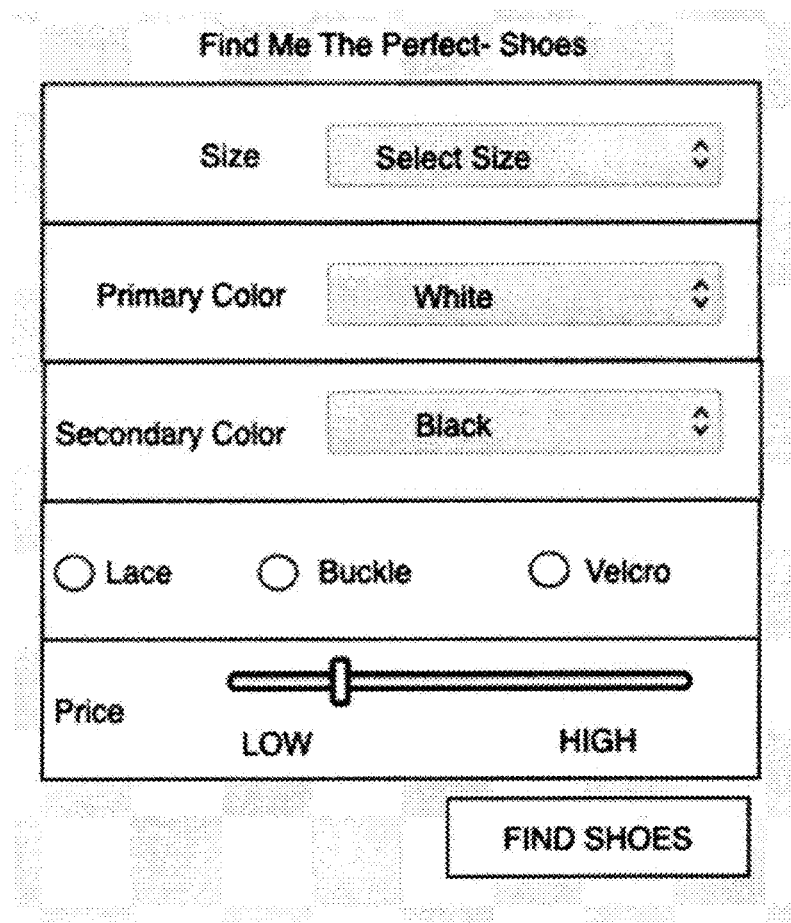
FIG. 9 is a representative drawing of a user interface for an associated information page for a modified embodiment of system and method according to the invention.

FIG. 9 is a representative drawing of a user interface for a modified embodiment of system and method according to the invention. More, specifically, FIG. 9 shows a contextual related offer window 900 for local goods and services associated with at least one provider of goods or services within a search result. For example, a user searching for tee times in a particular area may obtain a search result of a golf course, i.e. provider, and local information associated with the provider can include the provider selling golf shoes, or a third-party seller of golf shoes. Accordingly, it can be appreciated by person of ordinary skill in the art that other related offers associated with the goods or services indicated by the user as subject of the search, can be offered, and not just golf shoes as shown in FIG. 9. For example, as described above wherein the system and method according to the invention provides for entry of local information, local information in the context of this golf course search example, can include offers for goods associated with the golf services such as golf shoes, as well as other local information associated with the goods or services such as car or taxi services, and meal reservations relevant to the local area indicated by a user for search of the golf services.

FIG. 10 is a representative drawing of a user interface for a modified embodiment of system and method according to the invention. More, specifically, FIG. 10 shows an example search result 1000 window such as may be provided by the system in FIG. 2a, FIG. 2b, or FIG. 2c, and step 309 of FIG. 3, wherein the system returns results of the search request.

The system is provided with programming wherein the search results window 1000 is provided for a user interface wherein a number of interactive features can be provided with functionality to facilitate a review, modification, detail, and other information for the search results 1009 returned by the system such as shown in step 309 in FIG. 3.

The step of performing the search 302 can also include preprocessing of request to reconcile the search request and search parameters 111 with information associated with a registered user, such as registered user profile data 462, as well as pre-existing information in a user credentials database 465, as well as search criteria 110, predetermined search criteria 111 and additional predetermined criteria 112 which may preexist in the database 460.

In one embodiment of a system and method according to the invention, programming is provided to accept user commands and modifications to interact with the search results window 1000, such as last search 1001 and next search 1002, drop-down 1003, and new search 1004 to execute a new search request.

Furthermore, programming is provided to accept user modifications of the search parameters of the current search 1006, as well as display of the search results 1009 returned by the system in response to a search request. In addition, or the alternative, programming is provided to accept limited user modifications of the search to narrow the search results of the broader soups search performed under a new search 1004. Specifically, programming is provided to accept a limited search 1008, such as "find a new tee time."

Existing search engines, do not always present the exact same results, after leaving a page and returning back to the original page, that was previously provided when clicking the back arrow button. This is usually by design, as the back button in performs an entirely new search, based upon the original criteria, and may deliver different results or push other content to the page's result section for marketing or other purposes.

However, when researching a complex set of options to a unique question, a user needs to have a starting point and be able to return to it.

Accordingly, as an embodiment according to the invention shown in FIG. 10 includes an advanced breadcrumb approach incorporated in the last search feature 1001 so users can backtrack regardless of where they have navigated to within the system.

This embodiment is performed when the subscriber submits the request by clicking the find button, FIG. 8-08. The system then confirms there is at least one field has data inserted in it to perform the search, Moreover, programming is provided to accept user commands to receive additional information related to the search results, including a course comparison 1007, an advertising offer of related services or goods 1005, such as a "targeted premium banner", as well as additional detailed information 1010, 1011 returned by the search results 1009, such as a link 1010 to a third-party vendor of the goods and services associated with the least one of the search results, and/or detailed information 1011 of the goods and services information offered by a service provider associated with at least one of the search results.

In addition, or the alternative, programming is provided to accept user commands to directly proceed to engage 1010 in a transaction offered by the third-party vendor of goods and services associated with the at least one search results, such as "book this tee time now".

Furthermore, programming is provided to accept a user command to delete 1012 from the results window 1000 the at least one search result 1013.

Figure 11:
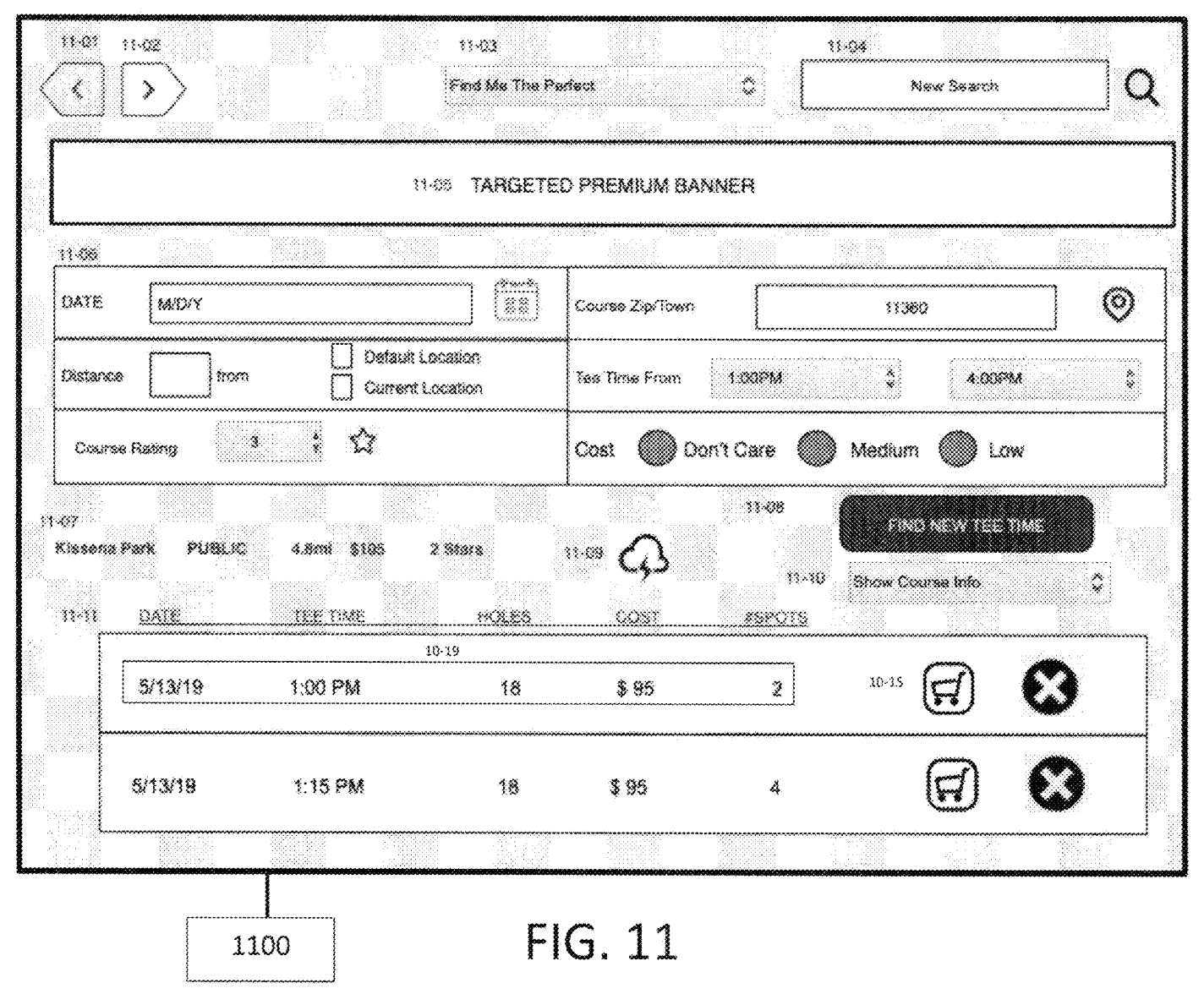

FIG. 11 is a representative drawing of a user interface for a modified embodiment of system and method according to the invention. More specifically, FIG. 11 shows a vendor engagement window 1100 such as may be provided by the system programming when the system receives a command from the user to engage 1010 the selected vendor services 1014, such as utilizing the "book this tee time now", such as shown in FIG. 10, and step 303 of FIG. 3.

In addition, vendor identification information 1107 can be provided by the programming to show the information of the vendor which user has selected to engage 1010 the vendor such as shown by FIG. 10. In addition, additional vendor services 1111 associated with the selected vendor services, such as alternate tee times can be provided.

In addition, programming is provided for additional related vendor information 1109, such as a weather report associated with the time and place of the selected vendor services, and/or other third-party vendor services associated with the selected vendor services 1107. Furthermore, programming can be provided to purchase selected vendor services 1115.

FIG. 12 is a representative drawing of a user interface for a modified embodiment of system and method according to the invention. More specifically, FIG. 12 shows a search results window 1200 provided by the system programming, which provides a summary results 1207 to a guest. The summary results include at least some of the information returned by a search request to the primary search database 461. Preferably, the summary results 1207 include information sufficient to indicate the quantity and quality of the search function of the system, and allow a user to register if the scope of the results are within a guest user's expectations.

In addition, the guest search results window 1200 includes a registration option wherein programming is provided for a registration process 1208 for the user to enter registration information, as known generally by persons of ordinary skill in the art of programming. In addition, the guest search results window 1200 can include programming for an additional information process 1209, wherein additional information about the services offered by the system and method can be provided in a separate window and offered by accessing a "Learn More" option 1209.

In addition, or in the alternative, as an additional embodiment, subscribers further have the option, after a search is completed, to modify their search in one of three ways. The subscriber can begin an entirely new search; constrain the current found set; or append to the original results with new information while retaining the original data.

As described above, at any point during the session, the system provides the user the option to navigate back to a desired page, receive their original content and continue searching by taking a different path by modifying the criteria that was previously entered.

An embodiment of the system and method according to the invention includes at least one process for launching a third-party service payment service in order to complete a financial transaction for services associated with the search results.

It can be appreciated by person of ordinary skill in the art, that the instructions of the process and method in the above written description and associated drawings can be modified and changed in insubstantial ways to give effect to the substantially same results. Nonetheless these modifications are within the scope of the invention. The foregoing merely illustrates the principles of the invention. It will thus be appreciated that those skilled in the art will be able to devise various arrangements which, although not explicitly described or shown herein, embody the principles of the invention and are thus within its spirit and scope. For example, a specified embodiment described herein related to golf can be alternative adapted for or included with other goods and/or services, such as tennis, clothing, restaurants, shoes, whether or not associated with a particular provider or location, among other things.

We claim:

1. A concierge service system for providing the concierge services to a user in a communications network, the system comprising:

A concierge server device having programming for establishing communications with at least one user and at least one provider;

a local collection device having programming for
   collecting local information,
   limiting said local information,
   converting said local information into searchable information,
   storing said searchable information in at least one stored database,
   contacting at least one provider and qualifying said at least one provider, wherein said contacting at least one provider includes visiting at least one website associated with the provider and collecting provider information for said qualifying said at least one provider, and a concierge device having programming for
   receiving a subscription for concierge services from a user,
   receiving at least one predetermined search criteria and at least one subscriber search criteria,
   searching for at least one provider based on the predetermined search criteria and the subscriber search criteria,
   storing at least one search result associated with the predetermined search criteria and subscriber search criteria in said at least one stored database, wherein said search result including provider information, and
   communicating portal link information to the subscriber.

2. The system according to claim 1, wherein said concierge server device includes a processor, a communications port, memory, a command interface, and server programming, wherein said server programming includes a portal builder programming, portal programming, search engine programming, and database programming.

3. The system according to claim 1, where in said local collection device includes a subscriber device including a processor, a communications port, memory, a command interface, client programming, and database programming.

4. The system according to claim 2, further comprising a client processing application having programming for communication with a login portal and screen for access by a user.

5. The system according to claim 3, further comprising a client processing application having programming for communication with a login portal and screen for access by a user.

6. The system according to claim 2, wherein the database programming includes server database management programming for user information, subscriber information, provider information, local information, and global information.

7. The system according to claim 3, wherein the database programming includes server database management programming for user information, subscriber information, provider information, local information, and global information.

8. The system according to claim 1 further comprising programming for receiving a user transaction request from a user, said user transaction request being associated with a user search result, and handling the user transaction request with a provider associated with the user search result.

9. The system according to claim 1, wherein the concierge server device further includes programming for receiving a fee from a subscriber associated with the subscription, and receiving a fee from a provider associated with a user transaction.

10. The system according to claim 1, wherein said local collection device further comprises programming for collecting local information, wherein said local information includes local goods and local services associated with at least one provider.

11. The system according to claim 1, wherein the system further includes programming for storing at least one search result associated with at least one project predetermined search criteria and subscriber search criteria in the stored database.

12. The system according to claim 1, wherein the system further includes programming for storing at least one search result wherein said search result includes provider information, and further includes programming for communicating portal link information to a subscriber.

13. The system according to claim 1, wherein the system further includes concierge script programming for prompting a user to enter information and receiving said prompted user information.

* * * * *